(12) United States Patent
Kraemer

(10) Patent No.: US 12,024,099 B2
(45) Date of Patent: Jul. 2, 2024

(54) ETHERNET PLUG CONNECTOR FOR A MOTOR VEHICLE AND PLUG CONNECTOR ASSEMBLY INCLUDING AN ETHERNET PLUG CONNECTOR

(71) Applicant: Robert Bosch GmbH, Stuttgart (DE)

(72) Inventor: Thomas Kraemer, Pforzheim (DE)

(73) Assignee: ROBERT BOSCH GMBH, Stuttgart (DE)

( * ) Notice: Subject to any disclaimer, the term of this patent is extended or adjusted under 35 U.S.C. 154(b) by 384 days.

(21) Appl. No.: 17/310,131

(22) PCT Filed: Dec. 27, 2019

(86) PCT No.: PCT/EP2019/087054
§ 371 (c)(1),
(2) Date: Oct. 5, 2021

(87) PCT Pub. No.: WO2020/151896
PCT Pub. Date: Jul. 30, 2020

(65) Prior Publication Data
US 2022/0048448 A1    Feb. 17, 2022

(30) Foreign Application Priority Data
Jan. 22, 2019   (DE) .................... 10 2019 200 713.9

(51) Int. Cl.
*B60R 16/02*    (2006.01)
*H01R 4/18*     (2006.01)
(Continued)

(52) U.S. Cl.
CPC ......... *B60R 16/0215* (2013.01); *H01R 4/184* (2013.01); *H01R 13/6582* (2013.01); *H01R 13/6592* (2013.01)

(58) Field of Classification Search
CPC . H01R 4/184; H01R 13/6582; H01R 13/6592
(Continued)

(56) References Cited

U.S. PATENT DOCUMENTS 4,398,783 A * 8/1983 Kelly ................. H01R 13/6585
                                                                439/748
5,330,371 A * 7/1994 Andrews ............ H01R 13/6582
                                                                439/607.06
(Continued)

FOREIGN PATENT DOCUMENTS

DE    68914194 T2    10/1994
DE    69311185 T2     1/1998
(Continued)

OTHER PUBLICATIONS

International Search Report for PCT/EP2019/087054 issued Mar. 9, 2020.

*Primary Examiner* — Peter G Leigh
(74) *Attorney, Agent, or Firm* — NORTON ROSE FULBRIGHT US LLP; Gerard A. Messina

(57) ABSTRACT

An Ethernet plug connector for a motor vehicle to be plugged together along a plug-in direction with a mating plug connector. The Ethernet plug connector includes a plug connector housing having at least two contact chambers and a shield plate. A contact element is situated in each contact chamber, a counter contact element being pluggable into each contact element. A line is attached to each contact element at its rear end with respect to the plug-in direction. The lines attached to the contact element are combined in a rear section with respect to the plug-in direction to form an Ethernet cable and are enclosed by a shield conductor, the shield plate enclosing the predominant part of the plug connector housing. The shield plate includes a connector, using which it is electrically connected to the shield conductor of the Ethernet cable.

13 Claims, 3 Drawing Sheets

(51) Int. Cl.
*H01R 13/6582* (2011.01)
*H01R 13/6592* (2011.01)

(58) Field of Classification Search
USPC .................................................. 439/607.41
See application file for complete search history.

(56) References Cited

U.S. PATENT DOCUMENTS

| | | | | |
|---|---|---|---|---|
| 6,203,369 | B1 * | 3/2001 | Feldman | ............... H01R 24/40 |
| | | | | 439/579 |
| 7,485,002 | B2 * | 2/2009 | Nishide | .................. H01R 13/28 |
| | | | | 439/607.17 |
| 2015/0236434 | A1 | 8/2015 | Listing et al. | |

FOREIGN PATENT DOCUMENTS

| | | | | |
|---|---|---|---|---|
| DE | 202008014168 | U1 | 3/2010 | |
| DE | 102012111125 | B4 | 4/2016 | |
| EP | 1923961 | A2 * | 5/2008 | ............. H01R 13/28 |
| EP | 3046189 | A2 * | 7/2016 | ............. H01R 13/42 |
| GB | 2104312 | A | 3/1983 | |
| JP | 2008130310 | A * | 6/2008 | ............. H01R 13/28 |
| JP | 2008130310 | A | 6/2008 | |
| JP | 2018152173 | A * | 9/2018 | ......... H01R 13/4223 |
| JP | 2018152173 | A | 9/2018 | |
| WO | WO-0131753 | A1 * | 5/2001 | ............. H01R 24/40 |
| WO | WO-2018163788 | A1 * | 9/2018 | ............. H01R 13/04 |
| WO | WO-2018168368 | A1 * | 9/2018 | ........... H01R 13/113 |

* cited by examiner

ETHERNET PLUG CONNECTOR FOR A MOTOR VEHICLE AND PLUG CONNECTOR ASSEMBLY INCLUDING AN ETHERNET PLUG CONNECTOR

FIELD

The present invention relates to an Ethernet plug connector for a motor vehicle and a plug connector assembly including an Ethernet plug connector.

BACKGROUND INFORMATION

Electrical plug connectors, which may be plugged together with complementary, mating plug connectors to form a plug connector assembly are conventional in the related art, for example, for automotive applications.

It is becoming necessary to process a continuously growing amount of information with increasing sensor equipment and on the path to autonomous driving. To manage the amounts of data, the use of Ethernet interfaces and Ethernet lines in the automotive field is being considered. These are, among other things, to enable a sufficiently high data transfer rate with the aid of so-called Ethernet protocols.

Conventional Ethernet plug connectors, so-called RJ-45 plugs, are conventional in the related art. Such an RJ-45 Ethernet plug is described in German Patent Application No. DE 10 2012 111 125 B4.

SUMMARY

The present invention is directed to the finding that in the automotive field, there are very high demands in regard to the long service life of the components (for example, plug connectors and interfaces) and with respect to the safety against short circuits, loose contacts, or interruptions of the signal transmission. In particular, in autonomous driving, it is thus absolutely necessary to avoid pieces of safety-relevant information, for example, from cameras or sensors, not being able to be processed due to a loose contact. These safety demands are to be complied with over a service life of, for example, at least 10 years or even at least 15 years, and for all possible external climatic factors, e.g., temperature, humidity, air pressure, or the like. However, they also have to apply for all possible operating states, for example, when driving over gravel roads, through potholes, at high acceleration rates or rotation rates.

At the same time, the cable length to be installed in motor vehicles is continuously increasing due to the number of sensors and due to the data exchange between different control units, so that reducing the number of cables or the total cable length is desirable. Due to the large number of plug connectors which have to be connected to a control unit, the dimensions of the Ethernet plug connectors are also to be kept as small as possible. Finally, good shielding is also necessary at the transition from the Ethernet plug connector to the mating plug connector to minimize or even eliminate the corruption of the signals to be transmitted.

It has been shown that conventional RJ-45 Ethernet plug connectors are not able to meet these safety demands to a sufficient extent. However, because of their geometry with respect to the mating plug connector, and also because of the insulation-displacement connection of the plug connector housing to the lines typically used in RJ-45 plug connectors they are not sufficiently stable against loose contacts and, for example, against strong vibration loads. Moreover, they have quite a wide construction, require quite rigid cables having 8 lines, and are also not sufficiently shielded. They are therefore basically not suitable for use in motor vehicles.

A demand may therefore exist to provide an Ethernet plug connector for motor vehicles, which withstands the climatic conditions and the loads during operation over the service life (at least 10 years or even at least 15 years) and does so both with respect to the attachment of the lines in the plug connector and at the transition from the plug connector to the mating plug connector. At the same time, its dimensions are to be compact and it is to enable the transfer of high data rates using the fewest possible lines. In addition, it is also to provide very good shielding at the transition to the mating plug connector. The Ethernet plug connector is also to be robust upon handling, so that it is ensured that no functional elements are damaged during the transportation or during the installation. Finally, it is desirable for the Ethernet plug connector for motor vehicles to be able to be plugged onto a mating plug connector designed as a standard interface or plugged together with it. One example of such a standard interface is, for example, the BOSCH micro-flex interface ("miniaturized flexible interface family based on 0.5 mm standardized contact pins," details in this regard retrievable at the application date, for example, under http://bosch-open-interfaces.de/de/home/).

SUMMARY

This demand may be met by example embodiments of the present invention. Advantageous specific embodiments of the present invention are described herein.

According to a first aspect of the present invention, an Ethernet plug connector for a motor vehicle to be plugged together along a plug-in direction with a mating plug connector is provided. In accordance with an example embodiment of the present invention, the Ethernet plug connector includes a plug connector housing including at least two contact chambers and a shield plate. A contact element is situated in each contact chamber. A counter contact element is pluggable into each contact element, a line being attached to each contact element on its rear end with respect to the plug-in direction, thus, for example, being electrically and mechanically connected, for example by a crimp connection. The lines attached to the contact element are combined to form an Ethernet cable in a rear section with respect to the plug-in direction and are enclosed by a shield conductor. The shield plate encloses the predominant part of the plug connector housing. The shield plate includes a connecting means (i.e., a connector), using which it is electrically connected to the shield conductor of the Ethernet cable. At least one contact lamella for contacting a shield counter contact element is situated on a front section of the shield plate with respect to the plug-in direction. The at least one contact lamella is bent in the space enclosed by the shield plate in such a way that the at least one contact lamella is situated at least in sections between a first wall of the shield plate and the plug connector housing.

This advantageously has the effect that the Ethernet plug connector is particularly well shielded over its entire extension, also beyond the connecting point to the mating plug connector.

The risk is also advantageously reduced that the at least one contact lamella will be damaged during transportation, since it protrudes only slightly or not at all beyond the outer contour made up of plug connector housing and shield plate. The Ethernet plug connector thus also has a particularly compact construction.

It is furthermore advantageous that the Ethernet plug connector also manages using only precisely two contacts and thus using precisely two lines, via which the data are transferred at a high data rate—the (Ethernet) cable which is connected to the Ethernet plug connector may thus be made very flexible, thus bendable, and material is saved (less line length, since fewer lines required). Ethernet plug connectors having, for example, four (contact) chambers and four contact elements and four lines connected thereon are also possible. An even number of contact chambers and contact elements is preferably used, although an odd number is not precluded.

Moreover, a particularly robust and long-lived and also maintenance-friendly design is advantageously provided by the plug connector housing, which is formed, for example, from an electrically insulating plastic, with its (contact) chambers and the contacts accommodated therein. This is because the contacts may be fixed particularly securely on the line, for example, by a crimp connection. If a contact is damaged, it may be replaced easily. If the plug connector housing is damaged, it may also be replaced easily, in that the contacts are simply removed from the (contact) chambers and inserted into a new plug connector housing.

In accordance with an example embodiment of the present invention, the plug connector housing preferably includes an opening on its front side with respect to the plug-in direction for each contact element to be accommodated, through which a counter contact element, for example, in the form of a pin, may be plugged into the contact element.

The number of the contact lamellae may correspond, for example, to the number of the contact chambers in the plug connector housing. One contact lamella may be situated, for example, under each contact chamber for a contact element—viewed transversely to the plug-in direction. A particularly symmetrical and compact structure of the plug connector may thus be effectuated. If more than two contact chambers are provided for contact elements, it may be sufficient if only precisely one contact lamella or precisely two contact lamellae are provided in the Ethernet plug connector. Due to the use of at least two contact lamellae, a redundancy is provided, which nonetheless ensures the shielding toward the mating plug connector even in the event of failure of a shield connection.

The at least one contact lamella is designed for (electrically) contacting a shield counter contact element. In that the at least one contact lamella is situated between the first wall of the shield plate and the plug connector housing, a shield counter contact element plugged in between the at least one contact lamella and the first wall may be electrically contacted both by the at least one contact lamella and the first wall. An electrical contact which is particularly safe and permanent, for example, in the event of vibration loads or in the event of thermal changes thus results.

The term "Ethernet plug connector" is to be understood here to mean that the plug connector is designed for transferring data and is suitable for data rates of at least 1 Gbit/s, particularly preferably at least 5 Gbit/s, and very particularly preferably at least 10 Gbit/s. These are the demands which have to be met upon the use of Ethernet data transfer in the motor vehicle, for example, for autonomous driving.

The term "for motor vehicles" is to be understood here to mean that the Ethernet plug connector is capable, upon use in a motor vehicle under all driving situations and environmental situations (for example, temperature range −40° C. to +80° C., strongly varying air pressures and ambient humidity values, acceleration action due to driving over potholes, over gravel roads, etc.) and over service life (at least 10 years or even at least 15 years), of enabling reliable, uninterrupted, and short circuit-free connection to a mating plug connector. In other words: it is to be designed suitably to meet the routine demands in the automotive industry for the transfer of safety-relevant signals as well.

The "front section" of the shield plate may be understood, for example, as a section which makes up, for example, at most 35%, preferably at most 25% of the length of the shield plate.

The connecting means provided at the shield plate may be formed, for example, by crimp tabs. Crimp tabs enable particularly cost-effective manufacturing of the shield plate and particularly simple, durable, and safe installation of the shield plate at the shield conductor of the Ethernet cable. The connecting means may be located at the rear end of the shield plate viewed with respect to the plug-in direction. It is to be noted that other connecting means are also possible.

The at least one contact lamella may initially project forward (along the plug-in direction) from the shield plate, for example, from the first wall of the shield plate, as a type of tab, for example, during the manufacturing of the Ethernet plug connector. It may then be bent to the rear by approximately 180° in a further manufacturing step—it then protrudes with its free end opposite to the plug-in direction to the rear. If the shield plate is subsequently installed at the plug connector housing, the at least one contact lamella thus comes to rest between the first wall and the plug connector housing. Of course, it is also possible to initially have the contact lamella protrude laterally (transverse to the plug-in direction) and then to bend it over inward.

In accordance with an example embodiment of the present invention, the at least one contact lamella in the finished manufactured Ethernet plug connector may preferably be situated by more than 70% of its length, preferably more than 90% of its length, between the first wall and a plug connector housing wall opposite to this first wall. In other words: the contact lamella only protrudes insignificantly beyond the outer contour of the Ethernet plug connector, whereby damage is avoided during transportation (for example, due to catching).

The shield plate encloses the plug connector housing, for example, in a U shape at its outside, thus by approximately 270° in the circumferential direction (viewed around the plug-in direction) or on 3 sides of a, for example, rectangular plug connector. An annular enclosure of the plug connector housing is also possible, making the enclosure nearly 360°, precisely 360°, or even more than 360°. Depending on the embodiment of the mating plug connector, an enclosure of the plug connector housing in the circumferential direction on, for example, only two sides or by at least 50% is also sufficient, thus more than 180°.

One refinement of the present invention provides that the at least one contact lamella is bent in the space enclosed by the shield plate in such a way that by a mating plug connector a shield counter contact element pluggable by a mating plug connector into the Ethernet plug connector between the at least one contact lamella and the first wall of the shield plate is electrically contacted by the at least one contact lamella. A particularly safe two-sided electrical and mechanical contacting is thus advantageously effectuated, which ensures the shield is maintained even in the event of vibrations and shaking loads.

One refinement of the present invention provides that the at least one contact lamella includes an embossed contact point, the first wall of the shield plate including an embossed further contact point which is opposite to the contact point of the contact lamella viewed transversely to the plug-in direction E. The electrical contacting at a defined point is thus advantageously effectuated particularly safely and reliably.

One refinement of the present invention provides that the at least one contact lamella is integrally formed with the shield plate. The shield plate may thus advantageously be manufactured particularly easily and cost-effectively and no additional transition resistances are to be taken into consideration.

Alternatively, it may be provided that the shield plate is a punched-bent part. Particularly simple and cost-effective manufacturing is thus advantageously ensured.

One refinement of the present invention provides that the lines in the Ethernet cable extend twisted around one another.

External interferences may thus advantageously be averaged out. For example, identical signals having a phase shift of 180° may be transmitted in each two lines. External interferences may additionally be averaged out due to the 180° phase offset.

One refinement of the present invention provides that the contact chambers each include a contact chamber undercut, the contact elements each including a contact element latching lance, so that the contact elements plugged into the contact chamber may latch with the contact element latching lance at the contact chamber undercut in the contact chamber. The installation of the contact elements in the plug connector housing is thus simplified and the contact elements are held securely in the plug connector housing.

Alternatively, it may be provided that the contact chambers each include a contact chamber latching lance, the contact elements each including a contact element undercut, so that the contact elements plugged into the contact chamber may latch with the contact element undercut at the contact chamber latching lance in the contact chamber. The installation of the contact elements in the plug connector housing is thus simplified and the contact elements are held securely in the plug connector housing.

A further locking element, a so-called secondary locking element, may also be provided for additionally securing the contact elements in the plug connector housing. This may be pushed through the plug connector housing, for example, transversely to the plug-in direction, and may engage behind an undercut of the contact element, so that a displacement of the contact element against the plug-in direction, thus out of the contact chamber, is no longer possible. In this case, the contact element latching lance or the contact chamber latching lance is used as a primary lock or primary latch and is mechanically relieved by the secondary locking element.

One refinement of the present invention provides that the Ethernet plug connector is designed to be plugged together with a mating plug connector in the form of a standard interface. The standard interface may be, for example, a BOSCH micro-flex interface. An Ethernet plug connector which is particularly easily replaceable and thus may be manufactured cost-effectively is thus advantageously provided.

The BOSCH micro-flex interface provides, for example, two-row mating plug connectors having, for example, 12, 16, 19, 26, 29, 36, 45, or 52 counter contact elements in the form of (contact) pins. These pins have, for example, a rectangular cross section of 0.5 mm×0.4 mm. A distance of 1.5 mm, for example, may be provided between the two rows (pin center to pin center). A distance of 1.8 mm, for example, may be provided within the row (pin center to pin center). Furthermore, for example, a four-row embodiment having, for example, 26, 32, 41, 52, 61, 72, 93, or 104 counter contact elements may be provided.

Other standard interfaces, in particular having a high number or large number of poles (more than 10 counter contact elements), may also be used.

According to a second aspect of the present invention, a plug connector assembly is provided. In accordance with an example embodiment of the present embodiment, the plug connector assembly includes a mating plug connector including at least two counter contact elements and at least one shield counter contact element and an Ethernet plug connector as described above. It is provided that the Ethernet plug connector is pluggable together with the mating plug connector.

It is thus advantageously also ensured upon the transition from an Ethernet cable into a component or on an interface that the shielding of the data lines may be ensured over the entire distance, also within the interface, and thus corruption of the data signals is avoided.

One refinement of the present invention provides that the at least two counter contact elements and the at least one shield counter contact element are identically formed. Particularly simple manufacturing of the mating plug connector is thus enabled. In addition, the same mating plug connector may thus be used for various intended uses. This is because, for example, the shield counter contact element may be used with another functionality in other applications, for example, for energizing a component connected thereto or for transferring data.

It is possible that the at least two counter contact elements and the at least one shield counter contact element have a rectangular cross section or even a square cross section.

One refinement of the present invention provides that the mating plug connector is designed in the form of a standard interface, the standard interface in particular being a BOSCH micro-flex interface, which is in particular designed in two rows or four rows. A plug connector assembly which is particularly easily replaceable and thus may be manufactured cost-effectively is thus advantageously provided.

BRIEF DESCRIPTION OF THE DRAWINGS

Further features and advantages of the present invention will be apparent to those skilled in the art from the following description of exemplary embodiments, which are not to be interpreted as restricting the present invention, however, with reference to the figures.

DETAILED DESCRIPTION OF EXAMPLE EMBODIMENTS

Figure 1A:
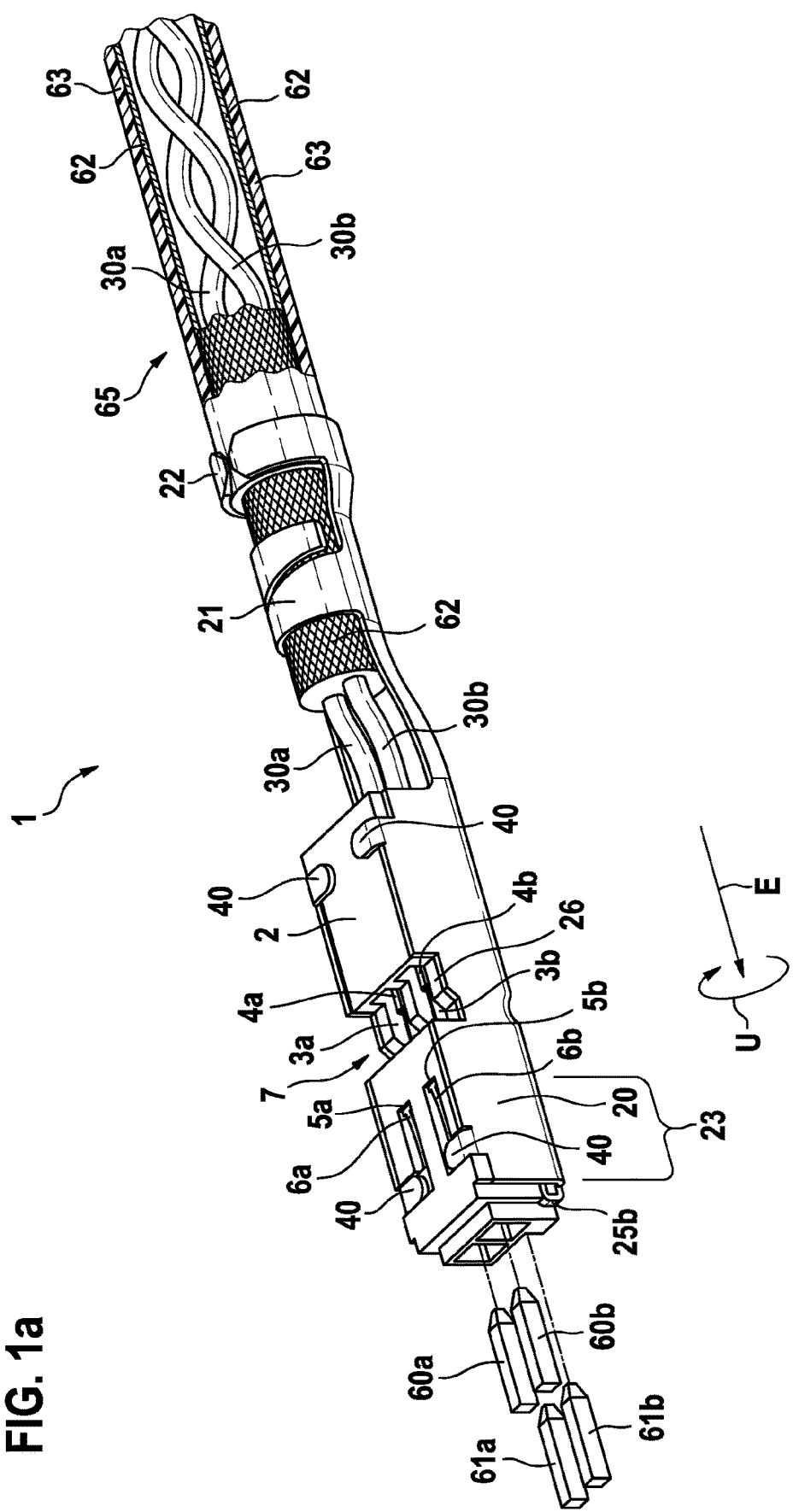
FIG. 1a shows a perspective representation of an Ethernet plug connector in accordance with an example embodiment of the present invention.
Figure 2:
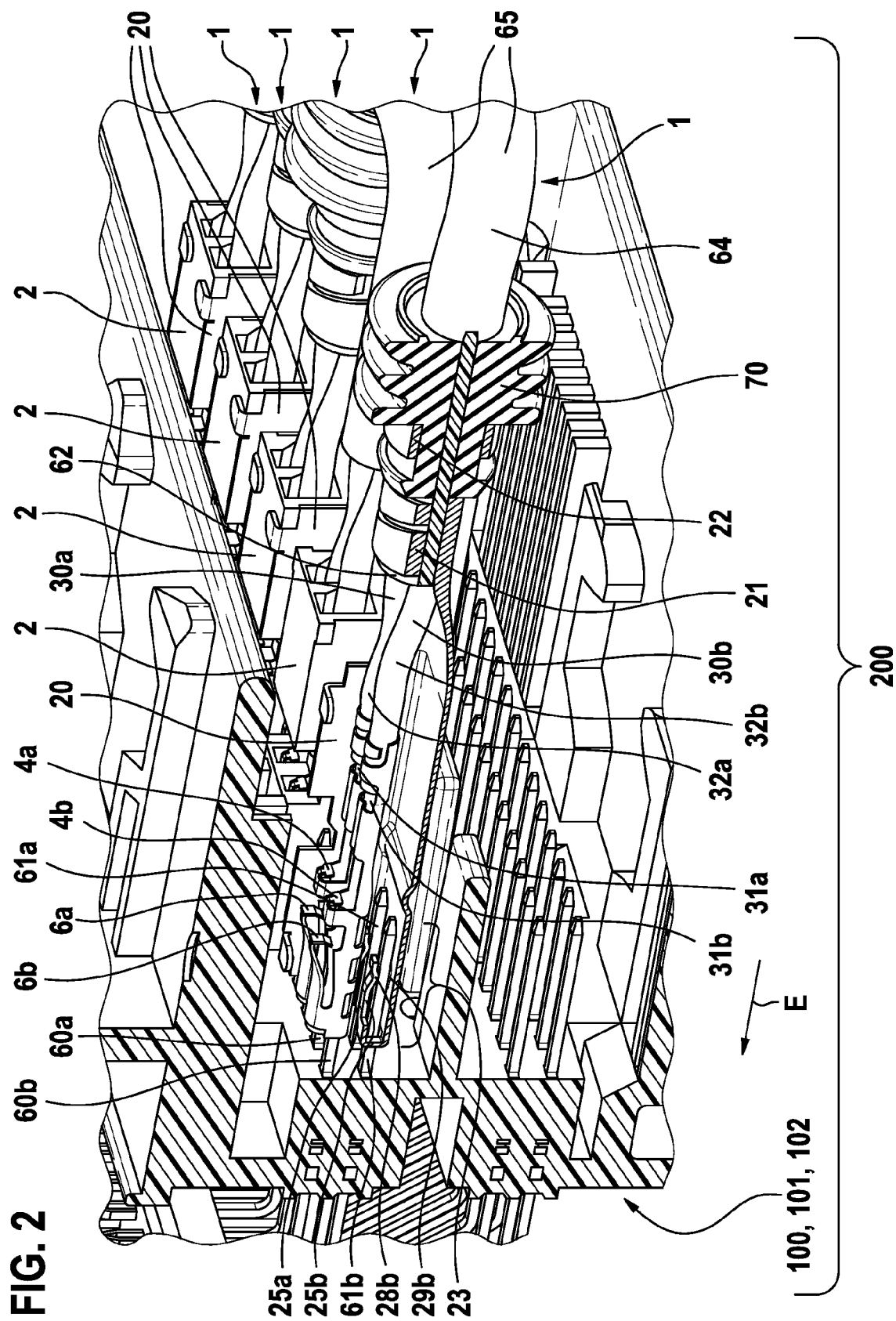
FIG. 2 shows a perspective, partially sectioned representation of a plug connector assembly including an Ethernet plug connector from FIG. 1a, in accordance with an example embodiment of the present invention.

FIG. 1a shows by way of example a perspective representation of an Ethernet plug connector 1 for a motor vehicle to be plugged together along a plug-in direction E with a mating plug connector 100 (see FIG. 2). Ethernet plug connector 1 includes: a plug connector housing 2 including two contact chambers 3a, 3b and a shield plate 20. One contact element 4a, 4b is situated in each contact chamber 3a, 3b, a counter contact element 60a, 60b being pluggable into each contact element 4a, 4b. One line 30a, 30b is attached to each contact element 4a, 4b at its rear end with respect to plug-in direction E, the two lines 30a, 30b attached to contact element 4a, 4b being combined in a rear section with respect to plug-in direction E to form an Ethernet cable 65 and being enclosed by a shield conductor 62, which may be formed, for example, as a shield braid. Lines 30a, 30b extend twisted around one another in Ethernet cable 65 to thus improve the signal quality.

Shield plate 20 encloses a predominant part of plug connector housing 2 along a circumferential direction U around plug-in direction E, in FIG. 1a on three sides in a U shape. Shield plate 20 includes a connecting means (i.e., connector) 21 in the form of crimp tabs, using which it is electrically connected to shield conductor 62 of Ethernet cable 65. A further connecting means 22, formed here as a pair of crimp tabs, is situated at the end of shield plate 20 and is used to fasten shield plate 20 at an insulation 63 of Ethernet cable 65. Alternatively or additionally, the further connecting means may also be fastened on a single-wire seal 70 (see FIG. 2).

The shield plate is fastened here, for example, using four tabs 40 on the upper side of plug connector housing 2 in the figure. First, plug connector housing 2 is thus situated in space 24 enclosed by the shield plate, thus placed in the cavity of the U shape, the four tabs 40 protruding upward (see FIG. 1b). Subsequently, the four tabs 40 are bent inward around the plug connector housing and thus captively fix shield plate 20 at plug connector housing 2.

Contact chambers 3a, 3b each include a contact chamber undercut 5a, 5b. Contact elements 4a, 4b each include a contact element latching lance 6a, 6b (see also FIG. 2), so that contact elements 4a, 4b plugged into contact chambers 3a, 3b latch using contact element latching lance 6a, 6b at contact chamber undercut 5a, 5b in contact chamber 3a, 3b. Another embodiment is also possible in principle (not shown here), in which contact chambers 3a, 3b each include a contact chamber latching lance, contact elements 4a, 4b each including a contact element undercut, so that contact elements 4a, 4b plugged into contact chambers 3a, 3b may latch using the contact element undercut at the contact chamber latching lance in contact chamber 3a, 3b.

In addition, plug connector housing 2 includes a plug connector housing secondary locking recess 7 and shield plate 20 includes a shield plate secondary locking recess 26, which align with one another. A secondary locking element may be inserted into these recesses, transversely to plug-in direction E, when Ethernet plug connector 1 is connected to mating plug connector 100. In this way, a removal of Ethernet plug connector 1 and also contact elements 4a, 4b situated therein counter to plug-in direction E from mating plug connector 100 is prevented.

On a front section 23 of shield plate 20 with respect to plug-in direction E, in the present exemplary embodiment, two contact lamellae 25a, 25b are situated for contacting a shield counter contact element 61a, 61b (in FIG. 1a, only a small part of contact lamella 25b is apparent).

Figure 1B:
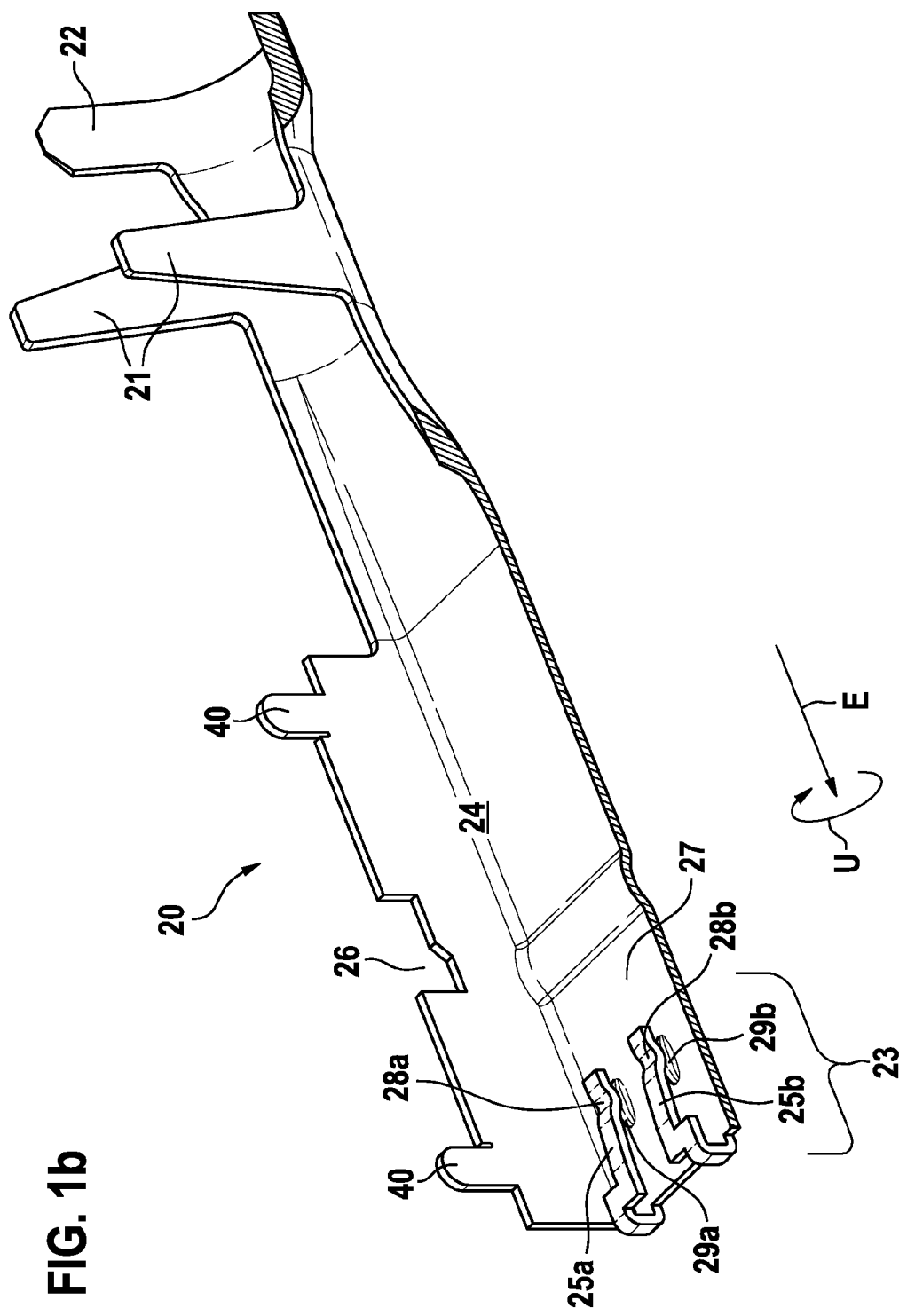
FIG. 1b shows a perspective representation of the shield plate of the Ethernet plug connector from FIG. 1a prior to the installation at the plug connector housing, in accordance with an example embodiment of the present invention.

FIG. 1b shows a perspective, partially sectioned representation of shield plate 20 of the Ethernet plug connector from FIG. 1a, before shield plate 20 is fixed at plug connector housing 2. The two contact lamellae 25a, 25b may be seen well here. Both contact lamellae 25a, 25b are bent in space 24 enclosed by shield plate 20 in such a way that the at least one contact lamella 25a, 25b is situated, at least in sections, between a first wall 27 of shield plate 20 and plug connector housing 2 (see also FIGS. 1a and 2a).

The two contact lamellae 25a, 25b are bent in space 24 enclosed by shield plate 20, a shield counter contact element 61a, 61b plugged by mating plug connector 100 into Ethernet plug connector 1 between one of contact lamellae 25a, 25b and first wall 27 of shield plate 20 is electrically contacted by contact lamella 25a, 25b in question.

It may be seen well in FIG. 1b that the at least one contact lamella 25a, 25b includes an embossed contact point 28a, 28b, and also first wall 27 of shield plate 20 includes an embossed further contact point 29a, 29b, which is opposite to contact point 28a, 28b of contact lamella 25a, 25b viewed transversely to plug-in direction E. A shield counter contact element 61a, 61b inserted between one of contact lamellae 25a, 25b and first wall 27 is thus electrically contacted from two sides at a defined point.

The two contact lamellae 25a, 25b are integrally formed with shield plate 20 in the illustrated exemplary embodiment. Shield plate 20 is designed as a punched-bent part.

FIG. 2 shows a perspective, partially sectioned representation of a plug connector assembly 200 including an Ethernet plug connector 1 from FIG. 1a.

Plug connector assembly 200 includes a mating plug connector 100 designed as a standard interface 101, solely by way of example here as a four-row BOSCH micro-flex interface 102. Mating plug connector 100 includes or contains a plurality of in each case two counter contact elements 60a, 60b and two shield counter contact elements 61a, 61b or includes them. Plug connector assembly 200 furthermore includes one or multiple Ethernet plug connectors 1, as shown in FIG. 1a. The plurality of Ethernet plug connectors 1 are plugged together with mating plug connector 100. In principle, a plug connector assembly 200 (not shown here) is also possible which includes only a single Ethernet plug connector 1.

In the illustration of FIG. 2, in Ethernet plug connector 1 facing toward the observer, plug connector housing 2 is intentionally not shown to make the design of shield plate 20 more clear. Plug connector housing 2 would be situated above contact lamellae 25a, 25b bent over to the rear, if it were shown. This housing is apparent in Ethernet plug connectors 1 shown further to the rear in the image plane.

Counter contact elements 60a, 60b and shield counter contact elements 61a, 61b are all formed identically, by way of example here as contact pins which are rectangular in cross section.

Ethernet cables 65 are annularly enclosed in the exemplary embodiment using a single-cable seal 70, by which penetration of moisture and dirt into the interior of plug connector assembly 200 is avoided.

Contact elements 4a, 4b are manufactured as punched-bent parts from sheet metal. Lines 30a, 30b include an electrically conductive core 31a, 31b, which is enclosed by an insulation 32a, 32b. Contact elements 4a, 4b are each fastened using an insulation crimp on insulation 32a, 32b and are electrically conductively connected using a conductor crimp on electrically conductive core 31a, 31b.

After the plurality of Ethernet plug connectors 1 has been plugged on mating plug connectors 100, 101, 102, contact elements 4a, 4b and plug connector housing 2 of Ethernet plug connector 1 may be captively fixed by the inserting of a secondary locking element (not shown here) transversely to plug-in direction E through plug connector housing secondary locking recesses 7 into mating plug connector 100.

What is claimed is:

1. An Ethernet plug connector for a motor vehicle to be plugged together along a plug-in direction with a mating plug connector, the Ethernet plug connector comprising:
   a plug connector housing including at least two contact chambers;
   a shield plate;
   a respective contact element situated in each of the contact chambers, a counter contact element being pluggable into each of the contact elements;
   a respective line attached to each contact element at its rear end with respect to the plug-in direction, the lines being combined in a rear section with respect to the plug-in direction to form an Ethernet cable and being enclosed by a shield conductor, wherein the shield plate encloses a predominant part of the plug connector housing, the shield plate including a connector by which the shield plate is electrically connected to the shield conductor of the Ethernet cable;
   at least one contact lamella, configured to contact a shield counter contact element, situated on a front section of the shield plate with respect to the plug-in direction, the at least one contact lamella being bent in a space enclosed by the shield plate in such a way that the at least one contact lamella is situated at least in sections between a first wall of the shield plate and the plug connector housing,
   wherein the at least one contact lamella is bent in the space enclosed by the shield plate in such a way that a shield counter contact element pluqqable by the mating plug connector into the Ethernet plug connector between the at least one contact lamella and the first wall of the shield plate is electrically contacted by the at least one contact lamella.

2. The Ethernet plug connector as recited in claim 1, wherein the at least one contact lamella is integrally formed with the shield plate and/or the shield plate is a punched-bent part.

3. The Ethernet plug connector as recited in claim 1, wherein the lines extend twisted around one another in the Ethernet cable.

4. The Ethernet plug connector as recited in claim 1, wherein:
   the contact chambers each include a contact chamber undercut, and the contact elements each include a contact element latching lance, so that the contact elements plugged into the contact chamber latch using the contact element latching lance at the contact chamber undercut in the contact chamber, or
   the contact chambers each include a contact chamber latching lance, the contact elements each include a contact element undercut, so that the contact elements plugged into the contact chambers latch using the contact element undercut at the contact chamber latching lance in the contact chamber.

5. The Ethernet plug connector as recited in claim 1, wherein the Ethernet plug connector is configured to be plugged together with a mating plug connector in the form of a standard interface.

6. The Ethernet plug connector as recited in claim 5, wherein the standard interface is a BOSCH micro-flex interface.

7. An Ethernet plug connector for a motor vehicle to be plugged together along a plug-in direction with a mating plug connector, the Ethernet plug connector comprising:
   a plug connector housing including at least two contact chambers;
   a shield plate;
   a respective contact element situated in each of the contact chambers, a counter contact element being pluggable into each of the contact elements;
   a respective line attached to each contact element at its rear end with respect to the plug-in direction, the lines being combined in a rear section with respect to the plug-in direction to form an Ethernet cable and being enclosed by a shield conductor, wherein the shield plate encloses a predominant part of the plug connector housing, the shield plate including a connector by which the shield plate is electrically connected to the shield conductor of the Ethernet cable;
   at least one contact lamella, configured to contact a shield counter contact element, situated on a front section of the shield plate with respect to the plug-in direction, the at least one contact lamella being bent in a space enclosed by the shield plate in such a way that the at least one contact lamella is situated at least in sections between a first wall of the shield plate and the plug connector housing,
   wherein the at least one contact lamella is bent in the space enclosed by the shield plate in such a way that a shield counter contact element pluggable by the mating plug connector into the Ethernet plug connector between the at least one contact lamella and the first wall of the shield plate is electrically contacted by the at least one contact lamella,
   wherein the at least one contact lamella includes an embossed contact point, the first wall of the shield plate includes an embossed further contact point which is opposite to the contact point of the contact lamella viewed transversely to the plug-in direction.

8. A plug connector assembly including:
   a mating plug connector including at least two counter contact elements and at least one shield counter contact element; and
   an Ethernet plug connector for a motor vehicle to be plugged together along a plug-in direction with the mating plug connector, the Ethernet plug connector including:
      a plug connector housing including at least two contact chambers,
      a shield plate,
      a respective contact element situated in each of the contact chambers, a respective one of the counter contact elements being pluggable into each of the contact elements,
      a respective line attached to each contact element at its rear end with respect to the plug-in direction, the lines being combined in a rear section with respect to the plug-in direction to form an Ethernet cable and being enclosed by a shield conductor, wherein the shield plate encloses a predominant part of the plug connector housing, the shield plate including a connector by which the shield plate is electrically connected to the shield conductor of the Ethernet cable, and
      at least one contact lamella, configured to contact the shield counter contact element, situated on a front section of the shield plate with respect to the plug-in direction, the at least one contact lamella being bent in a space enclosed by the shield plate in such a way that the at least one contact lamella is situated at least in sections between a first wall of the shield plate and the plug connector housing;

wherein the Ethernet plug connector is pluggable together with the mating plug connector, wherein the at least one contact lamella is bent in the space enclosed by the shield plate in such a way that a shield counter contact element pluggable by the mating plug connector into the Ethernet plug connector between the at least one contact lamella and the first wall of the shield plate is electrically contacted by the at least one contact lamella.

9. The plug connector assembly as recited in claim 8, wherein the at least two counter contact elements and the at least one shield counter contact element are formed identically.

10. The plug connector assembly as recited in claim 8, wherein the mating plug connector is configured in the form of a standard interface.

11. The plug connector assembly as recited in claim 10, wherein the standard interface is a BOSCH micro-flex interface, which is configured in two rows or four rows.

12. An Ethernet plug connector for a motor vehicle to be plugged together along a plug-in direction with a mating plug connector, the Ethernet plug connector comprising:
a plug connector housing;
a shield plate, wherein the shield plate encloses a predominant part of the plug connector housing;
at least one contact lamella, configured to contact a shield counter contact element, situated on a front section of the shield plate with respect to the plug-in direction, the at least one contact lamella being bent in a space enclosed by the shield plate in such a way that the at least one contact lamella is situated at least in sections between a first wall of the shield plate and the plug connector housing, wherein the at least one contact lamella is bent in the space enclosed by the shield plate in such a way that a shield counter contact element pluggable by the mating plug connector into the Ethernet plug connector between the at least one contact lamella and the first wall of the shield plate is electrically contacted by the at least one contact lamella.

13. An Ethernet plug connector for a motor vehicle to be plugged together along a plug-in direction with a mating plug connector, the Ethernet plug connector comprising:
a shield plate;
at least one contact lamella, configured to contact a shield counter contact element, situated on a front section of the shield plate with respect to the plug-in direction, the at least one contact lamella being bent in a space enclosed by the shield plate in such a way that the at least one contact lamella is situated at least in sections between a first wall of the shield plate and a plug connector housing, wherein the at least one contact lamella is bent in the space enclosed by the shield plate in such a way that a shield counter contact element pluggable by the mating plug connector into the Ethernet plug connector between the at least one contact lamella and the first wall of the shield plate is electrically contacted by the at least one contact lamella.

\* \* \* \* \*